(12) United States Patent
Kwong et al.

(10) Patent No.: US 7,999,512 B2
(45) Date of Patent: Aug. 16, 2011

(54) SINGLE-POWER-TRANSISTOR BATTERY-CHARGING CIRCUIT USING VOLTAGE-BOOSTED CLOCK

(75) Inventors: Kwok Kuen David Kwong, Davis, CA (US); Yat To William Wong, Hong Kong (HK); Ho Ming Karen Wan, Hong Kong (HK); Chik Wai David Ng, Hong Kong (HK)

(73) Assignee: Hong Kong Applied Science & Technology Research Institute Company, Ltd., Hong Kong (HK)

( * ) Notice: Subject to any disclaimer, the term of this patent is extended or adjusted under 35 U.S.C. 154(b) by 406 days.

(21) Appl. No.: 12/336,514

(22) Filed: Dec. 16, 2008

(65) Prior Publication Data

US 2010/0148727 A1    Jun. 17, 2010

(51) Int. Cl.
*H02J 7/00* (2006.01)
(52) U.S. Cl. ........................................................ 320/134
(58) Field of Classification Search .................. 320/134, 320/136
See application file for complete search history.

(56) References Cited

U.S. PATENT DOCUMENTS

| | | |
|---|---|---|
| 5,789,900 A | 8/1998 | Hasegawa et al. |
| 6,246,214 B1 | 6/2001 | Oglesbee |
| 6,670,790 B2 | 12/2003 | Stellberger |
| 2004/0174142 A1* | 9/2004 | Olson ........................... 320/135 |
| 2007/0035278 A1* | 2/2007 | Mullett et al. ................. 320/130 |

* cited by examiner

*Primary Examiner* — Melissa Koval
*Assistant Examiner* — Robert Grant
(74) *Attorney, Agent, or Firm* — Stuart T. Auvinen; gPatent LLC

(57) ABSTRACT

A charge/discharge protection circuit protects a battery from inadvertent shorting on a charger node that can connect to a charger or to a power supply of a portable electronic device. A single n-channel power transistor has a gate that controls a channel between the battery and the charger node. The gate is connected to the charger node by a gate-coupling transistor to turn off the power transistor, providing battery isolation. The gate is driven by a voltage-boosted clock through a switch activated by an enable signal. The enable signal also activates a grounding transistor to ground a gate of the gate-coupling transistor. A comparator compares voltages of the charger and battery nodes, and the compare output is latched to generate the enable signal. An inverse enable signal activates a second switch that drives the voltage-boosted clock to the gate of the gate-coupling transistor to turn off the power transistor.

17 Claims, 8 Drawing Sheets

240

SINGLE-POWER-TRANSISTOR BATTERY-CHARGING CIRCUIT USING VOLTAGE-BOOSTED CLOCK

FIELD OF THE INVENTION

This invention relates to battery chargers, and more particularly to charge and discharge regulation circuits using transistors.

BACKGROUND OF THE INVENTION

A wide variety of small, portable electronic devices rely on battery power. A regulator circuit may be used to control charging and discharging of the battery. The regulator circuit may allow an external charger to charge the battery in pulses rather than continuously to reduce heating and allow time for the battery to cool between charging pulses. The rate of pulses and pulse width of charging pulses may be adjusted to control temperature.

The regulator circuit may also be used to regulate discharging of the battery, when the battery supplies power to the portable electronic device. The regulator circuit may have a power transistor that is turned on and off to regulate a power voltage. The regulated power voltage may be compared to a reference voltage and fed back to the regulator circuit to control the power transistor. For example, the power transistor can be turned on when the regulated power voltage is too low, and turned off when the regulated power voltage is at or above the target voltage.

FIG. 1 shows a prior-art battery-charging system. Battery 208 is protected by power transistor 210, which has its gate controlled by charge/discharge regulator 206. Battery 208 can drive load 204, which can be a portable electronic circuit or device. When charger 202 is attached, charger 202 may drive load 204 while charging battery 208 by driving charging current through power transistor 210.

Power transistor 210 can be a p-channel transistor with a parasitic diode 212, such as from a p+ drain to the n-well substrate. Diode 212 can protect battery 208 from inadvertent discharge. The "key-chain problem" occurs when a portable electronic device is carried in a person's pocket and has its charging terminals accidentally shorted by metal keys in the person's pocket. Shorting the two terminals to the left of charge/discharge regulator 206 in FIG. 1 could cause battery 208 to be rapidly discharged, except that diode 212 would block this large discharge current. Thus diode 212 provides some protection against the key-chain problem.

However, diode 212 does not protect against large currents in the other direction. If the wrong kind of charger 202 is attached by mistake, a large current could flow through diode 212 to battery 208 even when power transistor 210 is turned off. This large current could damage battery 208.

FIG. 2 shows a prior-art battery-charging system with two power transistors in series. A second power transistor 216 is added in series with power transistor 210. Charge/discharge regulator 206 controls both power transistors 210, 216. A second parasitic diode 214 is formed with power transistor 216. Second parasitic diode 214 may be a P+ source to N-well, while parasitic diode 212 is a P+ drain to N-well.

Since second parasitic diode 214 is in the opposite direction to parasitic diode 212, current in either direction is blocked when power transistors 210, 216 are turned off by charge/discharge regulator 206. Battery 208 is protected from both rapid discharge due to key-chain shorting, and from rapid charging currents due to charger 202. Charger 202 may not be a smart charger and may tend to provide too large of a charging current.

While useful, having two power transistors 210, 216 in series is undesirable, since the effective ON-resistance is increased, or a larger transistor size is needed. The battery charger is less effective since the larger resistance of the regulator power transistors 210, 216 reduces the power-supply voltage provided to load 204 and increases power loss and heating.

What is desired is a battery regulator system that uses only a single power transistor. A single-power-transistor charge regulator is desired that still provides protection against inadvertent shorting caused by the key-chain problem, and against damage to the battery from large charger currents. A charge regulator that does not have latch-up problems is also desirable.

DETAILED DESCRIPTION

The present invention relates to an improvement in battery charging regulators. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
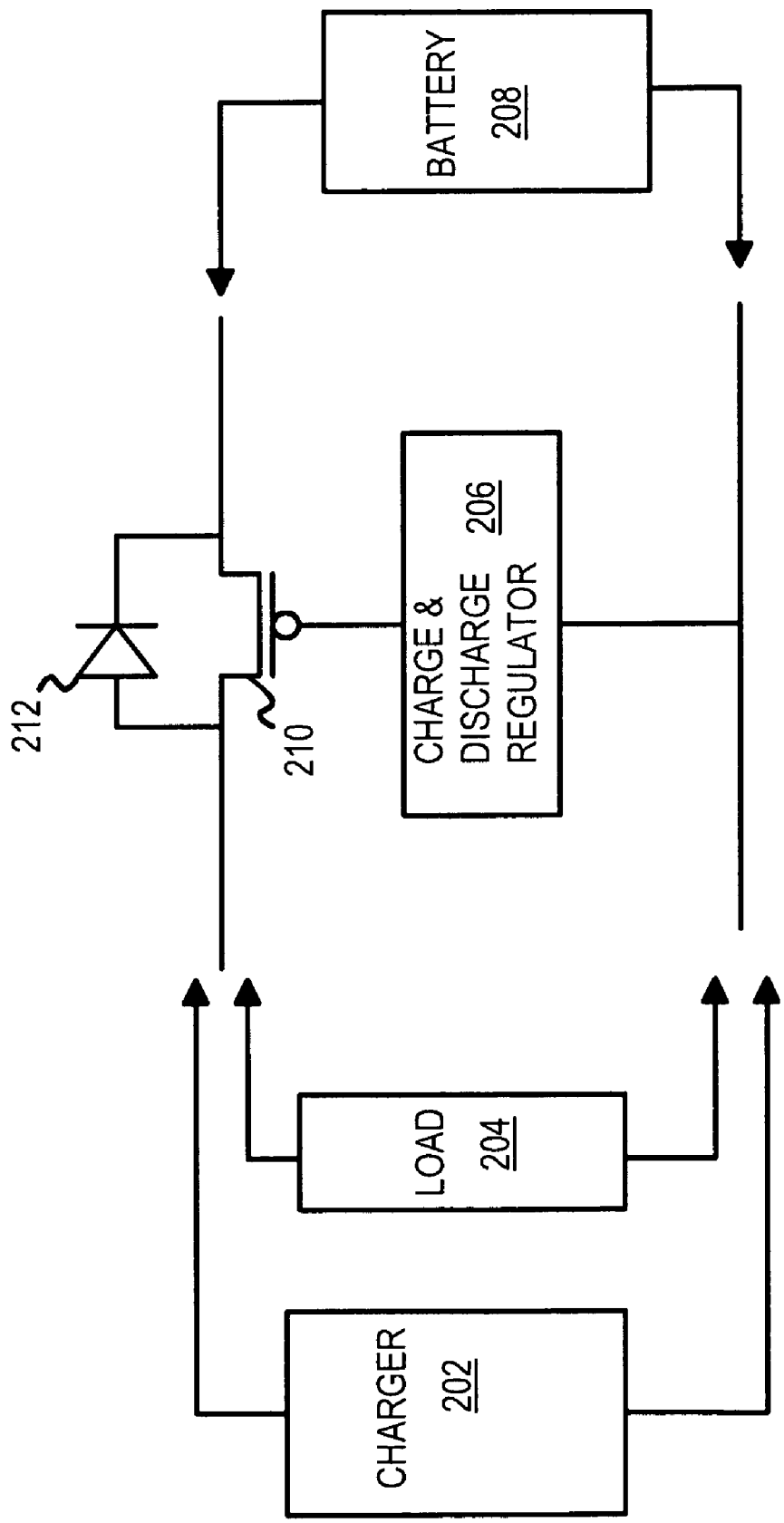
FIG. 1 shows a prior-art battery-charging system.
Figure 2:
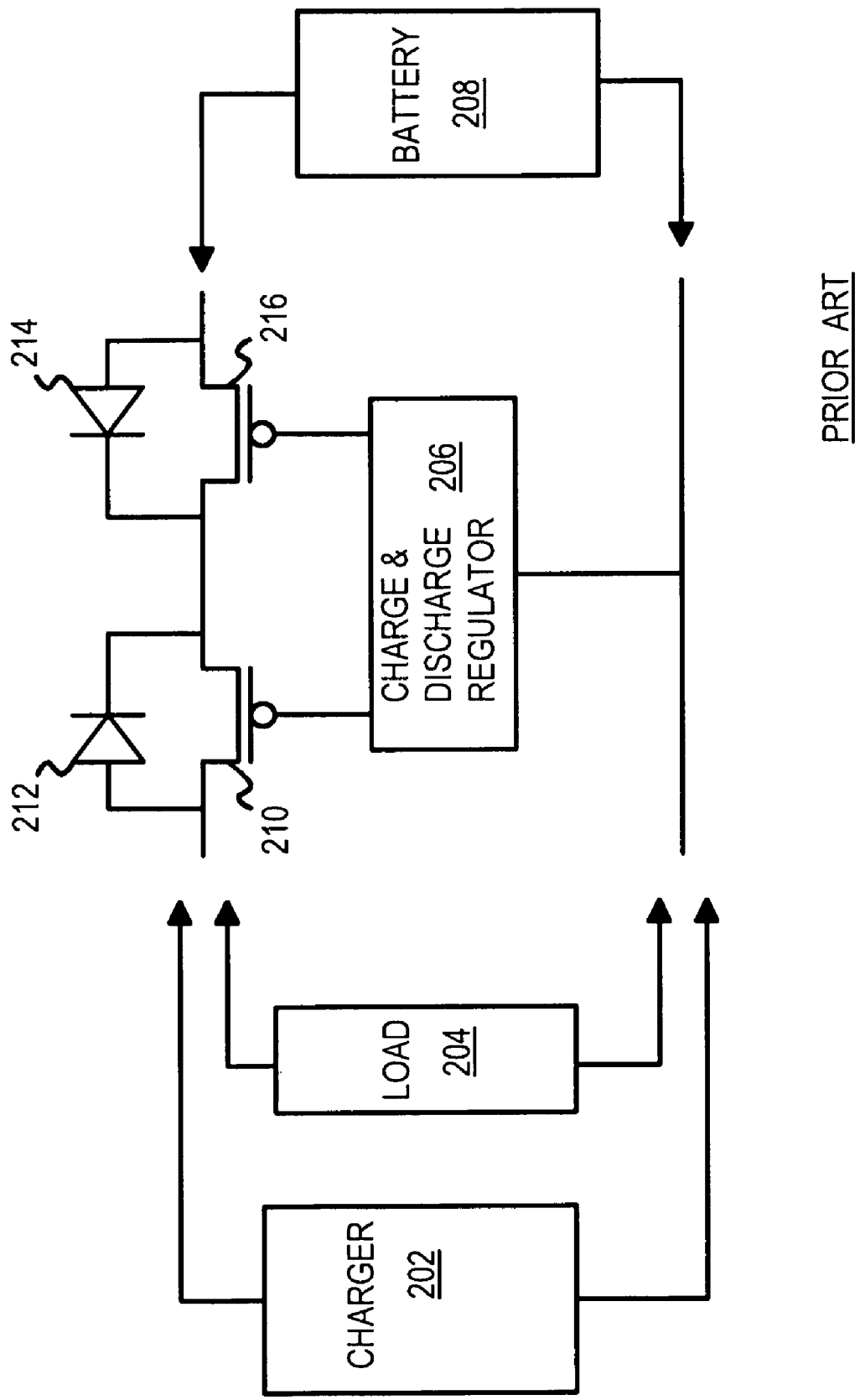
FIG. 2 shows a prior-art battery-charging system with two power transistors in series.
Figure 3:
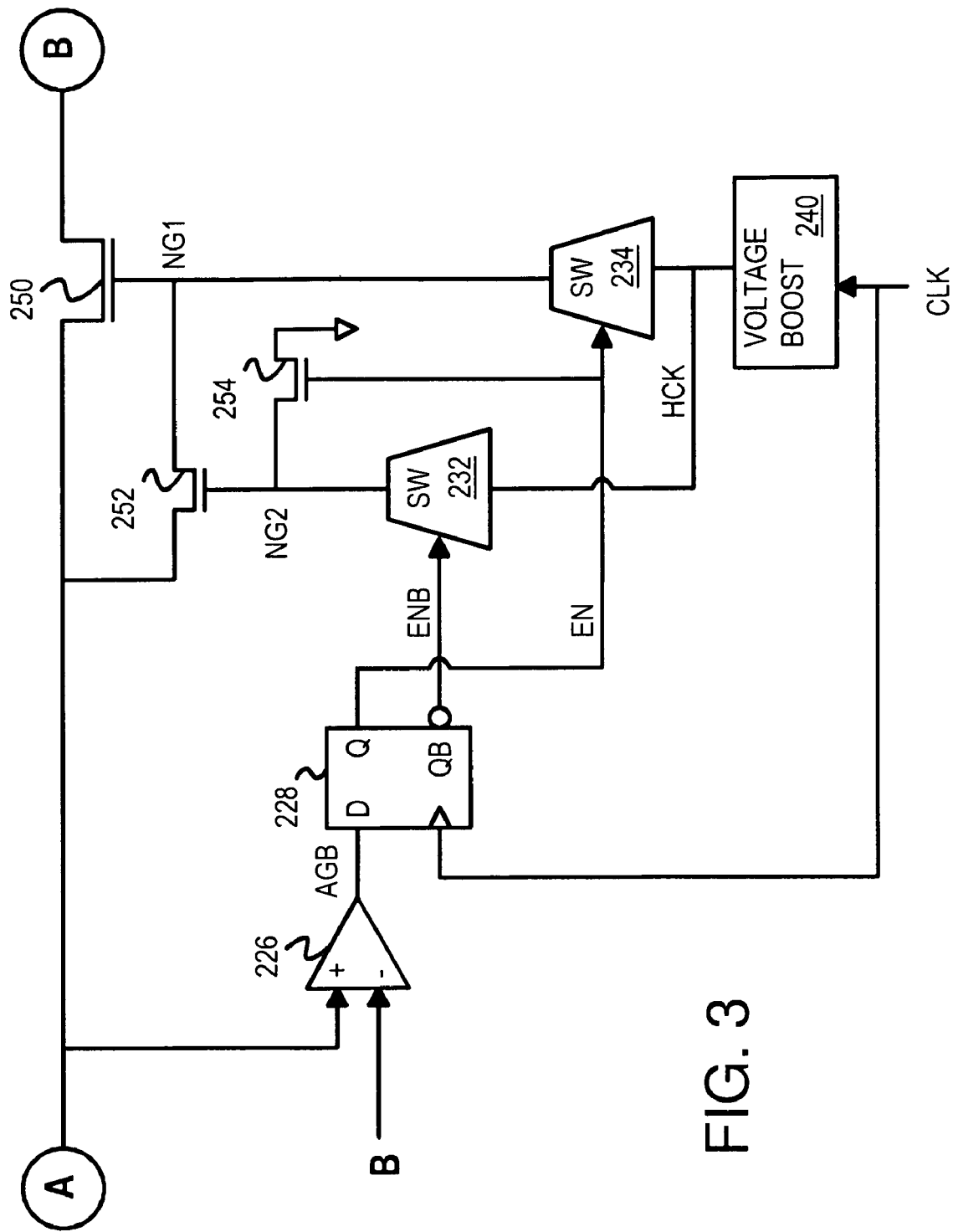
FIG. 3 is a diagram of a uni-directional boosted battery-charging regulator.

FIG. 3 is a diagram of a uni-directional boosted battery-charging regulator. The circuit of FIG. 3 can replace power transistor 210 and charge/discharge regulator 206 of FIG. 1 and operate to protect a battery attached to node B that is charged by a charger on node A, or drives a load circuit on node A.

Power transistor 250 is an n-channel transistor that regulates current between nodes A, B. Parasitic diodes may be present with power transistor 250 that are not shown, such as a N+ source/drain to p-type well or substrate diode. The bulk terminals of transistors 250, 252, 254, 255, 259 are connected to ground.

A clock CLK drives voltage booster 240, which uses a charge pump or other voltage-boosting circuit to generate a boosted-voltage clock HCK. For example, HCK can have a high level that is a transistor-threshold above VDD, or VDD+ Vtn. This boosted-voltage clock HCK is applied to the gate of power transistor 250 by switch 234 when EN is high and ENB is low, but is applied to the gate of gate-coupling transistor 252 by switch 232 when ENB is high and EN is low.

The boosted voltage of HCK drives the gate of either power transistor 250 or gate-coupling transistor 252 to a boosted voltage of about VDD+Vtn. This over-drives the gate, increasing the gate-to-source voltage and thus increasing the current flow in the transistors. The effective ON resistance is also reduced by over-driving the gate. Thus smaller transistor sizes may be used to reduce area and cost.

Having a single power transistor 250 between nodes A, B rather than having two transistors in series also helps reduce area, cost, and ON-resistance. Use of n-channel rather than p-channel for power transistor 250 also reduces area, cost, and ON-resistance, since electrons in n-channel transistors have a mobility about double that of holes in p-channel transistors.

The voltages of nodes A, B are compared by comparator 226, which can be an op amp or other differential comparator. When the voltage of node A is greater than the voltage of node B, comparator 226 drives AGB high, which is the D input to flip-flop 228. Flip-flop 228 is clocked by clock CLK, and latches in the state of AGB to drive its Q, QB outputs.

The high AGB drives EN high and ENB low. The high EN turns on switch 234, which connects HCK to gate node NG1, which is the gate of power transistor 250. The low ENB turns off switch 232 so that HCK is not driven to node NG2. Instead, the high EN is applied to the gate of grounding transistor 254, which turns on to drive node NG2 to ground. Since NG2, the gate of gate-coupling transistor 252, is low, gate-coupling transistor 252 is turned off. Charging current flows from node A, through power transistor 250, to node B. There is no parasitic diode that can be forward biased to pass a large unwanted current. When an N-well process is used, one terminal of the parasitic diode is grounded.

When comparator 226 determines that node A is lower in voltage than node B, AGB is low. The low AGB drives ENB high and EN low. The high ENB turns on switch 232, which connects HCK to secondary gate node NG2, which is the gate of gate-coupling transistor 252.

The low EN turns off switch 234 so that HCK is not driven to node NG1. Switch 234 is in a high-impedance (Hi-Z) output state. The low EN is also applied to the gate of grounding transistor 254, which turns off, allowing second gate node NG2 to be driven by HCK through switch 232, which is enabled by ENB high.

Since NG2, the gate of gate-coupling transistor 252, is driven high by HCK through switch 232, gate-coupling transistor 252 is turned on when HCK pulses high, connecting the lower voltage of node A (the source when A<B) to gate node NG1. Thus the gate and source of power transistor 250 are shorted together, and current may not flow from node B to node A. Node B is effectively isolated from node A by power transistor 250.

When switch 234 is enabled, when HCK pulses high to VDD+Vtn, power transistor 250 turns on strongly on the high HCK pulses, but turns off when HCK pulses low. Node NG1 is driven low during these low pulses of HCK, turning off power transistor 250. The period and pulse width or duty cycle of HCK can be adjusted to provide the desired charging characteristics, such as to reduce over-heating while still maintaining target regulated power-supply voltages.

Likewise, when switch 232 is enabled, when HCK pulses high to VDD+Vtn, gate-coupling transistor 252 turns on strongly on the high HCK pulses, but turns off when HCK pulses low. Node NG1 is isolated during these low pulses of HCK. Since leakage is usually small, node NG1 remains near the source voltage during the low pulses of HCK.

When node B has a higher voltage than node A, the battery on node B supplies current to a portable circuit on node A, while discharging current is blocked by power transistor 250 which is turned off and biased to isolate node B from node A. This prevents large currents due to key-chain shorts. A small offset can be introduced into comparator 226 to allow power transistor 250 to remain on when the battery on B is driving the electronic load on node A when the voltage difference between nodes B, A is less than the offset.

Alternately, multiple regulation circuits (FIG. 3) could be provided: one power transistor 250 and its circuit of FIG. 3 between a charger on node A and the battery on node B, and another power transistor 250 and its circuit in FIG. 3 between the battery on node A and the electronic device load on node B. Current only flows from node A to node B.

Figure 4:
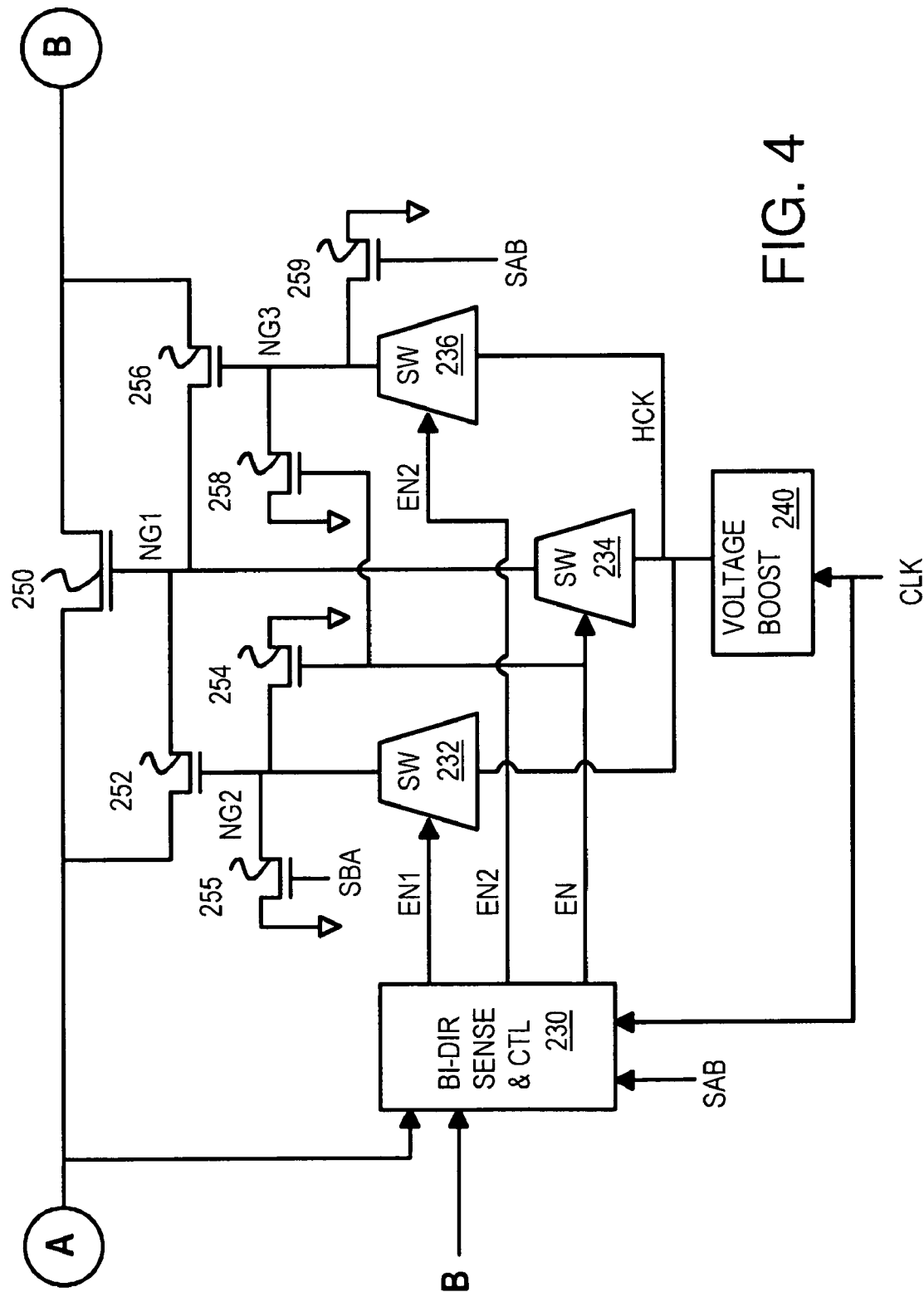
FIG. 4 is a diagram of a bi-directional boosted battery-charging regulator.

FIG. 4 is a diagram of a bi-directional boosted battery-charging regulator. The circuit of FIG. 4 can replace power transistor 210 and charge/discharge regulator 206 of FIG. 1 and operate to protect a battery attached to node A that is charged by a charger on node B, or drives a load circuit on node B.

Power transistor 250 is an n-channel transistor that regulates current between nodes A, B. Switches 232, 234 and voltage booster 240 operate as described earlier for FIG. 3. However, gate node NG1 is also protected for reverse currents in FIG. 4.

A direction input SAB is applied to bi-directional sense and control circuit 230, which compares the voltage of nodes A, B. For example, bi-directional sense and control circuit 230 could have a comparator and flip-flop as shown in FIG. 3, with additional logic gates to generate three enables: EN, EN1, EN2.

When SAB is high, the intended current flow is from node A to node B. When node A's voltage is greater than node B's voltage, EN is driven high and EN1, EN2 are driven low by bi-directional sense and control circuit 230. EN activates switch 234 to drive HCK to gate node NG1, turning on power transistor 250. Since the gate node NG1 has a pulsed boosted voltage, the current drive is higher than if VDD was used. Pulsing allows time for power transistor 250 to cool during low pulses of HCK. Current can flow from node A to node B, such as from a charger on node A to a battery on node B. Secondary gate nodes NG2, NG3 are grounded by n-channel grounding transistors 254, 258, which receive EN on their gates. This turns off gate-coupling transistors 252, 256, allowing switch 234 to drive gate node NG1.

When SAB is high, but node A's voltage is lower than node B's voltage, current would flow in the unintended (reverse) direction. To prevent reverse current flow, power transistor 250 is biased in isolation. EN and EN2 are driven low and EN1 is driven high by bi-directional sense and control circuit 230. EN low causes switch 234 to enter a high-impedance output state, not driving gate node NG1. The low EN also turns off n-channel grounding transistors 254, 258.

The high EN1 turns on switch 232, driving HCK to secondary node NG2. This turns on gate-coupling transistor 252, which shorts node A to gate node NG1. Since the source and gate of power transistor 250 are shorted together by gate-coupling transistor 252, current flow is blocked. A battery on node B cannot be accidentally discharged, such as due to a key-chain short on node A.

N-channel select grounding transistor 259 is used to ground node NG3 when select A-to-B (SAB) is active. Rather than use SAB on its gate, n-channel select grounding transistor 259 could have EN1 on its gate. Rather than use n-channel select grounding transistor 259, a logic gate such as an OR gate could also combine EN and EN1 (or SAB) before driving the gate of grounding transistor 258. Then n-channel select grounding transistor 259 would not be needed.

When SAB is low, the intended current flow is from node B to node A. When node B's voltage is greater than node A's voltage, EN is driven high and EN1, EN2 are driven low by bi-directional sense and control circuit 230. EN activates switch 234 to drive HCK to gate node NG1, turning on power transistor 250 during the high pulses of HCK. Current can flow from node B to node A, such as from a battery on node B to an electronic device load on node A. Secondary gate nodes NG2, NG3 are grounded by n-channel grounding transistors 254, 258, which receive EN on their gates. This turns off gate-coupling transistors 252, 256, allowing switch 234 to drive gate node NG1.

When SAB is low, but node B's voltage is less than node A's voltage, current would flow in the un-selected (A to B) direction. To prevent reverse current flow, power transistor 250 is biased in isolation. EN and EN1 are driven low and EN2 is driven high by bi-directional sense and control circuit 230. EN low causes switch 234 to enter a high-impedance output state, not driving gate node NG1. The low EN also turns off n-channel grounding transistors 254, 258.

The high EN2 turns on switch 236, driving HCK to secondary node NG3. This turns on n-channel gate-coupling transistor 256, which shorts node B to gate node NG1. Since the source and gate of power transistor 250 are shorted together by gate-coupling transistor 256, current flow is blocked. A battery on node B cannot be accidentally overcharged, such as due to a charger or electro-static-discharge (ESD) on node A.

N-channel select grounding transistor 255 is used to ground node NG2 when select A-to-B (SAB) is inactive. Rather than use the inverse of SAB (SBA) on its gate, n-channel select grounding transistor 255 could have EN2 on its gate. Rather than use n-channel select grounding transistor 255, a logic gate such as an OR gate could also combine EN and EN2 (or SBA) before driving the gate of grounding transistor 254. Then n-channel select grounding transistor 255 would not be needed.

When switch 236 is enabled, and HCK pulses high to VDD+Vtn, gate-coupling transistor 256 turns on strongly on these high HCK pulses, but turns off when HCK pulses low. Node NG1 is isolated during these low pulses of HCK. Since leakage is usually small, node NG1 remains near the source voltage during the low pulses of HCK.

Likewise, when switch 232 is enabled, when HCK pulses high to VDD+Vtn, gate-coupling transistor 252 turns on strongly on these high HCK pulses, but turns off when HCK pulses low. Node NG1 is isolated during these low pulses of HCK. Since leakage is usually small, node NG1 remains near the source voltage during the low pulses of HCK.

When switch 234 is enabled, when HCK pulses high to VDD+Vtn, power transistor 250 turns on strongly on these high HCK pulses, but turns off when HCK pulses low. Node NG1 is driven low during these low pulses of HCK, turning off power transistor 250. The period and pulse width or duty cycle of HCK can be adjusted to provide the desired charging characteristics, such as to reduce over-heating while still maintaining target regulated power-supply voltages.

Figure 5:
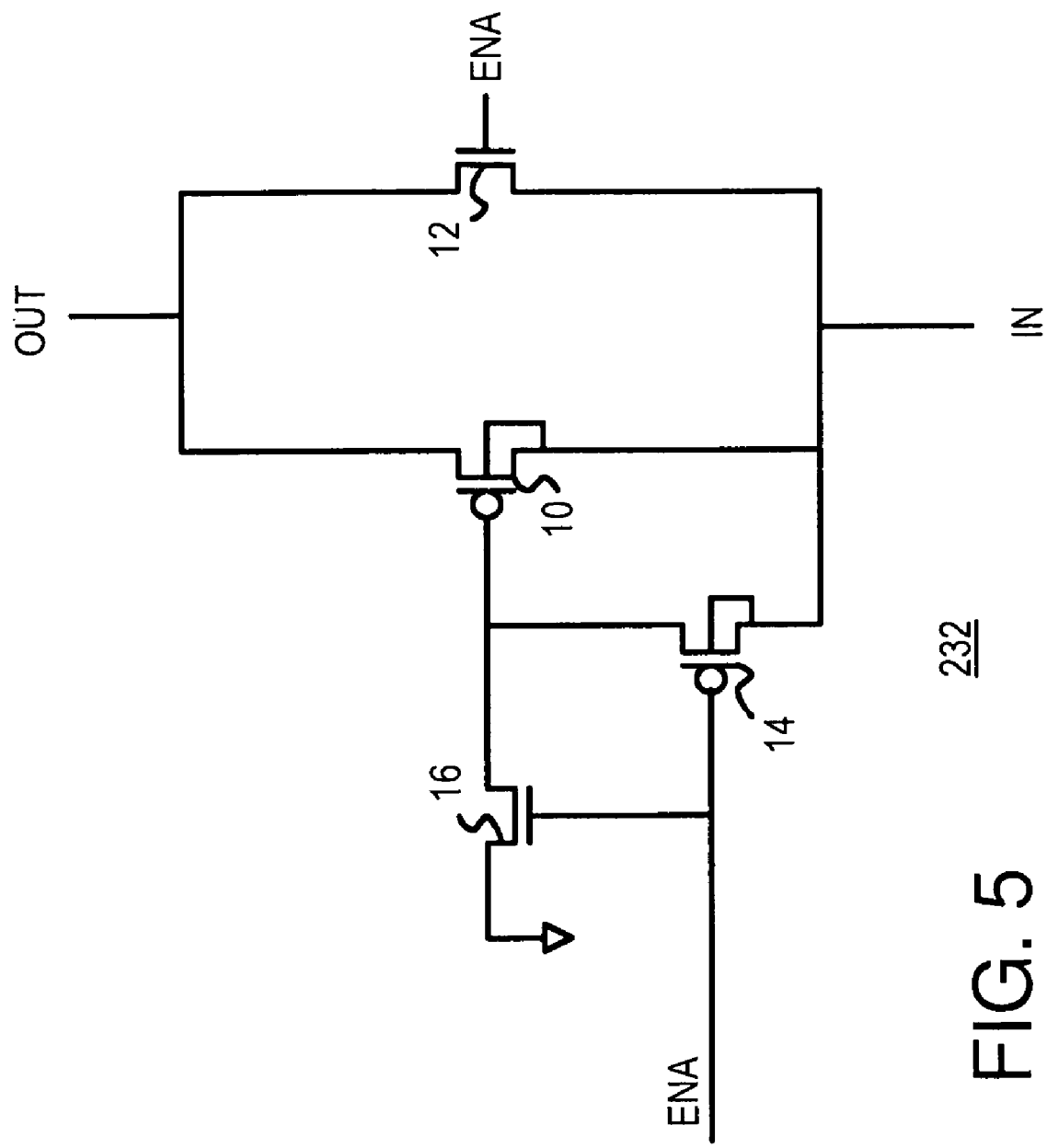
FIG. 5 is a schematic of a switch that passes a boosted clock.

FIG. 5 is a schematic of a switch that passes a boosted clock. Switch 232 can be either of switches 232, 236 in FIG. 4. The boosted clock HCK is received by input IN and the gate node NG2 or NG3 is driven by OUT. The enable ENA drives the gates of n-channel grounding transistor 16 and p-channel disabling transistor 14, causing the gate of p-channel pass transistor 10 to be driven to ground by grounding transistor 16 when ENA is high, or driven by IN by disabling transistor 14 when ENA is low.

N-channel pass transistor 12 is in parallel with p-channel pass transistor 10 between IN and OUT, forming a transmission gate. When ENA is high, both pass transistors 10, 12 are on. When ENA is low, both pass transistors 10, 12 are off.

The bulk or well terminals of p-channel pass transistor 10 and p-channel disabling transistor 14 are connected to IN. Since IN is the boosted clock HCK, IN may be higher than VDD. Thus the substrate and source terminals of transistors 10, 14 are connected to the highest voltage. Since p-channel disabling transistor 14 shorts the gate to the source of p-channel pass transistor 10, the gate-to-source voltage is zero, turning p-channel pass transistor 10 off when ENA is low.

Figure 6:
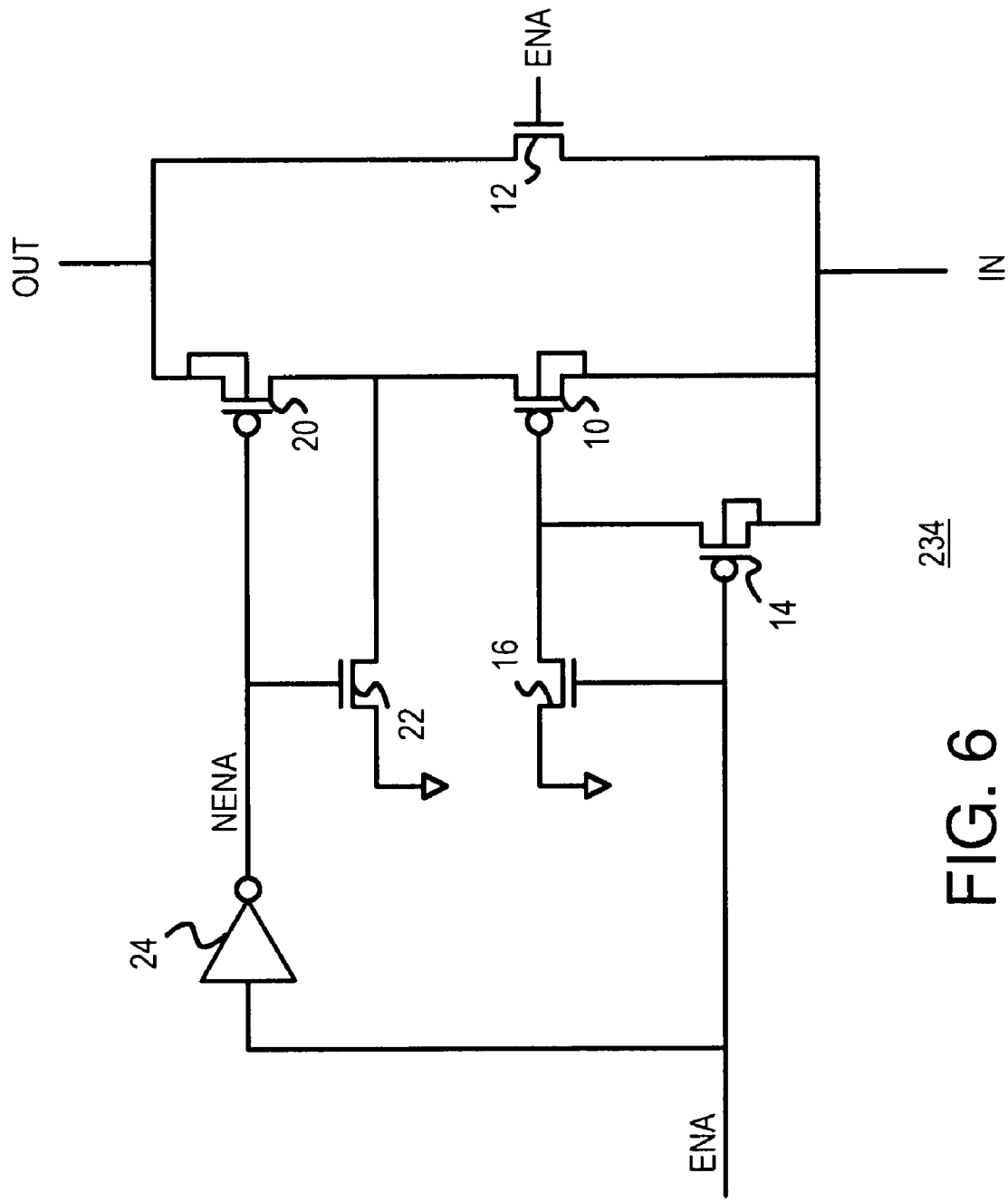
FIG. 6 is a schematic of a bi-directional-protected switch that passes a boosted clock.

FIG. 6 is a schematic of a bi-directional-protected switch that passes a boosted clock. Switch 234 drives gate node NG1 in FIG. 4. Since gate node NG1 may be connected to an external voltage when power transistor 250 is isolating, and the external voltage may have large spikes or be above VDD, switch 234 is protected against high voltages at the OUT terminal as well as at the IN terminal, which receives boosted clock HCK.

N-channel pass transistor 12 is in parallel with p-channel pass transistors 10, between IN and OUT, forming a transmission gate. When ENA is high, all pass transistors 10, 12, 20 are on. When ENA is low, all pass transistors 10, 12, 20 are off. Having p-channel pass transistors 10, 12 in series between IN and OUT provides protection against high voltages in both directions.

When ENA is high, inverter 24 drives a low onto the gates of transistors 20, 22, turning on p-channel pass transistor 20 and turning off n-channel grounding transistor 22. The enable signal ENA also drives the gates of n-channel grounding transistor 16 and p-channel disabling transistor 14. ENA causes the gate of p-channel pass transistor 10 to be driven to ground by grounding transistor 16 when ENA is high. Thus both pass transistors 10, 20 are turned on when ENA is high.

When ENA is low, inverter 24 drives a high onto the gates of transistors 20, 22, turning off p-channel pass transistor 20 and turning on n-channel grounding transistor 22, which grounds the node between pass transistors 10, 20. The low enable ENA also turns off of n-channel grounding transistor 16 and turns on p-channel disabling transistor 14. Since p-channel disabling transistor 14 shorts the gate to the source of p-channel pass transistor 10, the gate-to-source voltage is zero, turning p-channel pass transistor 10 off. Thus both pass transistors 10, 20 are turned off when ENA is low.

The bulk or well terminals of p-channel pass transistor 20 is connected to OUT. Any high voltage on OUT is thus also applied to the bulk node of p-channel pass transistor 20. The bulk or well terminals of p-channel pass transistor 10 and p-channel disabling transistor 14 are connected to IN. Since IN is the boosted clock HCK, IN may be higher than VDD. Thus the substrate and source terminals of transistors 10, 14, 20 are each connected to the highest voltage on their source/drains, since the other source/drain is grounded by grounding transistor 22 or grounding transistor 16.

Figure 7:
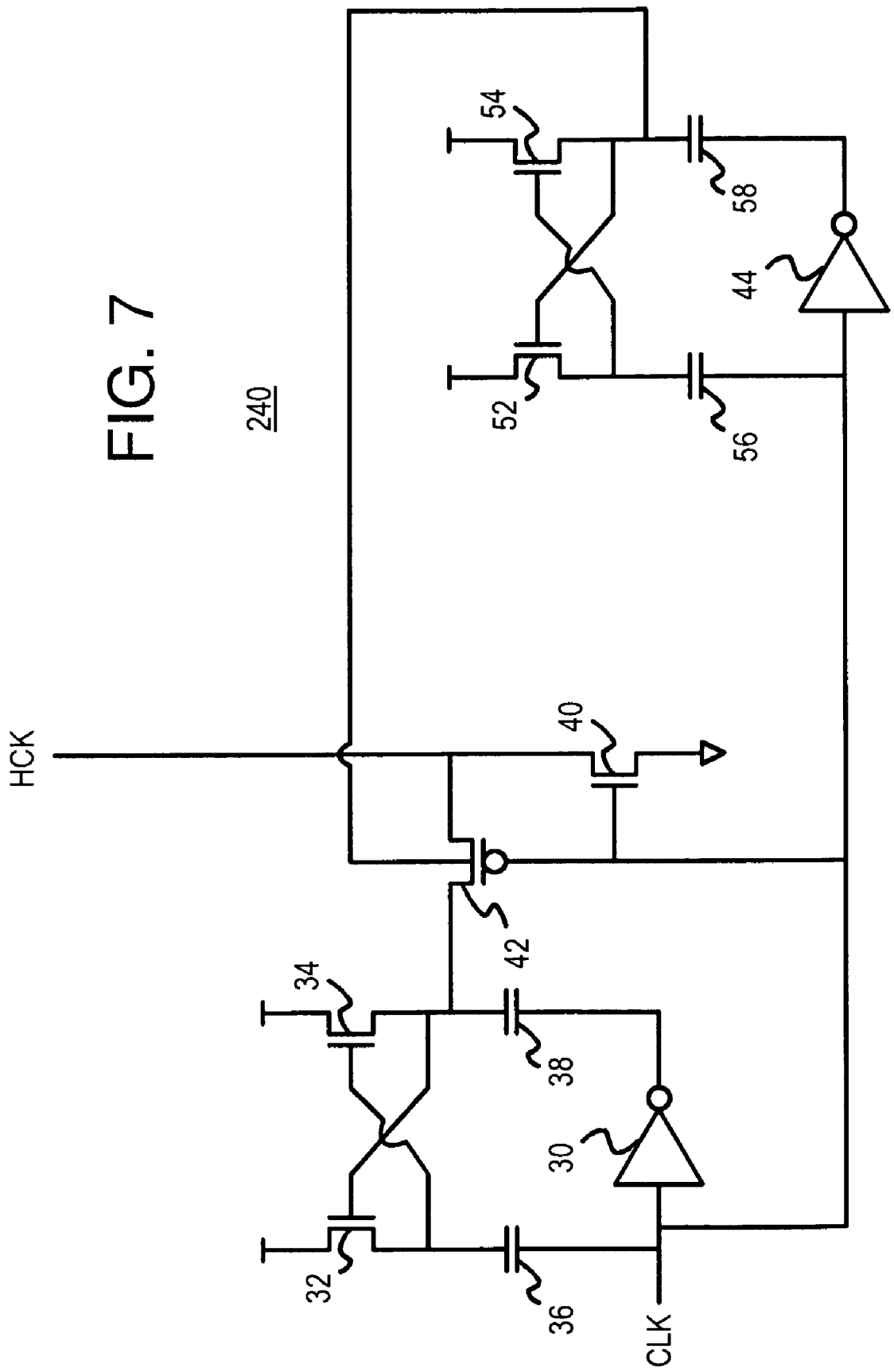
FIG. 7 is a schematic of a voltage booster.

FIG. 7 is a schematic of a voltage booster. Voltage booster 240 (also in FIGS. 3-4) receivers a clock CLK that swings between ground and the power supply VDD, and generates a boosted clock HCK that between ground and the boosted voltage VDD+Vtn.

Inverter 30 ensures that capacitors 36, 38 are driven to opposite states by the clock. The clock voltage swing is coupled across capacitors 36, 38 to toggle a bi-stable of n-channel bi-stable transistors 32, 34 into opposite states. The gates and drains of n-channel bi-stable transistors 32, 34 are cross-coupled. The drains of n-channel bi-stable transistors 32, 34 re-charge the top plates of capacitors 36, 38 to VDD-Vtn.

When capacitor 38 is driven from ground to VDD by inverter 38, the other side of capacitor 38 is driven from VDD-Vtn. to 2VDD-Vtn, minus any losses such as due to capacitor coupling ratios and leakages. When clock CLK is low, p-channel pump transistor 42 turns on, driving the boosted voltage on capacitor 38 onto HCK. When CLK is high, p-channel pump transistor 42 turns off and n-channel transistor 40 turns on to drive HCK low.

The bulk node of p-channel pump transistor 42 is driven by a second pump of inverter 44, n-channel bi-stable transistors 52, 54, and capacitors 56, 58. When CLK is high, the bulk and source of p-channel pump transistor 42 are both driven with boosted voltages.

Figure 8:
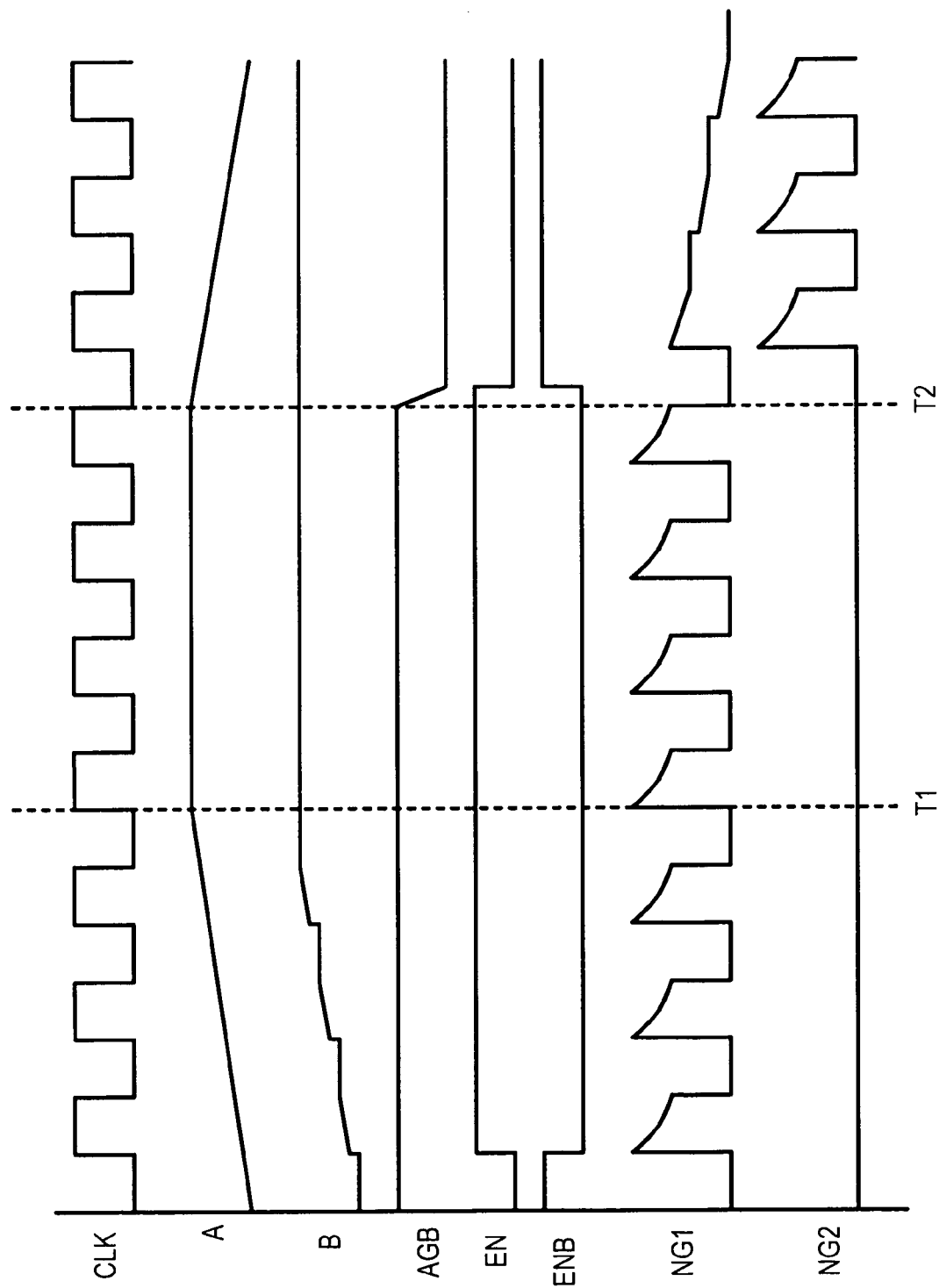
FIG. 8 is a waveform of operation of the boosted battery-charging regulator of FIG. 3.

FIG. 8 is a waveform of operation of the boosted battery-charging regulator of FIG. 3.

AGB is high when node A has a higher voltage than node B, until time T2 when node A falls below node B and goes AGB low. AGB high allows EN to go high and ENB low before time T2. Switch 234 is on and switch 232 is off (FIG. 3), allowing the boosted clock to be driven onto gate node NG1 while second gate node NG2 remains grounded. The higher voltage on node A allows current to flow through power transistor 250 to node B. Node B thus follows node A higher in voltage from time 0 to time T1, although steps are seen in node B due to the pulsing of NG1.

AGB is low when node A has a lower voltage than node B, after time T2. AGB low drives ENB to high and EN low after time T2. Switch 234 is off and switch 232 is on (FIG. 3), allowing the boosted clock to be driven onto second gate node NG2 while gate node NG1 is discharged to ground over several clock periods.

Despite the higher voltage on node B, the low voltage on gate node NG1 turns off power transistor 250, preventing current flow to node A. Node B is isolated from node A.

Alternate Embodiments

Several other embodiments are contemplated by the inventors. For example the switches, comparators, voltage boosters, etc. could be implemented in a variety of ways.

While pulse charging has been described, using boosted clock HCK to drive the gate of power transistor 250 on and off, a linear charger could also be designed. Rather than pulse HCK, HCK could remain high when CLK goes low. The gate voltage of power transistor 250 may be designed to cause power transistor 250 to operate in the saturated region, or in the linear region. A pulsed charger might pulse HCK and bias power transistor 250 in the saturated region, while a linear charger might not pulse HCK and bias power transistor 250 in the linear region, for typical voltages expected on nodes A, B.

While voltages for nodes A, B that are "greater than" or "less than" have been described, voltages that are equal or nearly equal may produce the results of greater than or less than, depending on exact biases and offsets, both intentional and parasitic. The exact voltages may vary with process, temperature, and supply voltage conditions.

The select A→B signal, SAB, could be driven by a sensing circuit that determines when the charger is physically or electrically plugged into the portable device. For example, a plug in a cable to the charger could physically move a small sensor switch or pin that then generates the SAB signal. SAB could be driven high when the charger is connected, allowing current to flow from the charger on node A to the battery on node B. SAB could be driven low when the charger is not connected, allowing current to flow from the battery on node B to the portable electronic device load on node A. The battery would be protected from current flow in the un-selected direction in both cases.

Capacitors, resistors, and other filter elements may be added. Switches could be added, such as n-channel transistors, p-channel transistors, or transmission gates with parallel n-channel and p-channel transistors. Circuits may be inverted and use n-channel rather than p-channel transistors, and use p-channel rather than n-channel transistors. Wells or substrates under transistors may be connected to a common bias voltage, or each transistor may connect its source and well together. Various combinations may be used. The +, − inputs may be swapped to invert the comparator output, or other internal connections swapped.

Other trigger and compare circuits could be substituted, such as using a J-K flip-flop, a set-reset latch, a toggle flip-flop, or the clock and reset inputs of a D-type flip-flop with the D-input grounded rather. Other kinds of bi-stable elements could also be substituted. Standard inverters and buffers or logic gates may be added to produce the desired delays and clocks. While a flip-flop or latch has been shown to latch the comparator output, such latching could be deleted and unlatched compare results used by the control circuit to generate the enable signals.

Some components may not be present in a real circuit, but are idealized components in the schematics. For example, load 204 may represent a load by an actual device that may have thousands of transistors in complex arrangements rather than a single resistor to ground. Components may be deleted or implemented as part of other circuits.

Additional components may be added at various nodes, such as resistors, capacitors, inductors, transistors, etc., and parasitic components may also be present. Enabling and disabling the circuit could be accomplished with additional transistors or in other ways. Pass-gate transistors or transmission gates could be added for isolation.

Inversions may be added, or extra buffering. The final sizes of transistors and capacitors may be selected after circuit simulation or field testing. Metal-mask options or other programmable components may be used to select the final capacitor, resistor, or transistor sizes.

While Complementary-Metal-Oxide-Semiconductor (CMOS) transistors have been described, other transistor technologies and variations may be substituted, and materials other than silicon may be used, such as Galium-Arsinide (GaAs) and other variations.

While positive currents have been described, currents may be negative or positive, as electrons or holes may be considered the carrier in some cases. Charging and discharging may be interchangeable terms when referring to carriers of opposite polarity. Currents may flow in the reverse direction. Clocks may be active in the high state or active in the low state and can be inverted, buffered, or qualified with other signals such as with logic gates. The source and drain nodes of a transistor are interchangeable, depending on bias voltages currently applied to the transistor. Thus the term drain may act as a source for certain bias conditions and as a drain for other bias conditions. Likewise, when the term source is used, it is understood that this source may sometimes act as a drain and other times act as a source. The terms source and drain are used interchangeably with the more exact term "source/drain".

Charge/discharge regulator 206 and other circuits may use a power supply voltage from the battery, from the charger, or a switchable power supply from either, or a voltage from another source. While a boosted voltage of VDD+Vtn has been described, the boosted voltage may have other values above VDD, and may differ from ideal values due to losses from capacitance coupling ratios, leakage, etc. The ideal boosted voltage may be 2*VDD, buy such losses may reduce the actual boosted voltage to a level closer to VDD+Vtn.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A battery protection circuit comprising:
a battery node for connecting to a terminal of a battery;
a charger node for connecting to a terminal of a charger that charges the battery;
a power transistor having a channel connected between the battery node and the charger node, and a gate that controls the channel, the gate connected to a first gate node;
a comparator having inputs connected to the battery node and to the charger node, for generating a compare output from a voltage difference between the battery node and the charger node;
a control circuit that receives the compare output from the comparator and generates a first enable signal and a second enable signal;
a voltage booster, receiving a clock, for generating a boosted clock, the boosted clock having a higher high voltage than a high voltage of the clock;
a first switch, receiving the boosted clock from the voltage booster, for applying the boosted clock to the first gate node in response to the first enable signal;
a gate-coupling transistor having a channel connected between the charger node and the first gate node, and a gate that controls the channel, the gate connected to a second gate node;
a second switch, receiving the boosted clock from the voltage booster, for applying the boosted clock to the second gate node in response to the second enable signal; and
a grounding transistor that connects the second gate node to a ground when the second switch is not applying the boosted clock to the second gate node;
wherein the control circuit further generates a third enable signal;
wherein during a connecting first state the control circuit activates the first enable signal and de-activates the second enable signal and the third enable signal;
wherein during an isolating second state the control circuit activates the second enable signal and de-activates the first enable signal and the third enable signal;
wherein during an isolating third state the control circuit activates the third enable signal and de-activates the first enable signal and the second enable signal,
whereby the power transistor is biased by the gate-coupling transistor to shut off and isolate the battery node from the charger node when the second enable signal is activated and the first enable signal is de-activated.

2. The battery protection circuit of claim 1 wherein the first switch isolates the first gate node from the boosted clock by providing a high-impedance output to the first gate node when the first enable signal is de-activated;
wherein the second switch isolates the second gate node from the boosted clock by providing a high-impedance output to the second gate node when the second enable signal is de-activated,
whereby high-impedance outputs are provided by the first switch and the second switch when not activated.

3. The battery protection circuit of claim 2 wherein the power transistor is a n-channel transistor.

4. The battery protection circuit of claim 3 wherein the gate-coupling transistor and the grounding transistor are n-channel transistors.

5. The battery protection circuit of claim 4 wherein the charger node also connects to a power-supply input to a portable electronic device that is powered by the battery when the power transistor is enabled.

6. The battery protection circuit of claim 1 wherein the control circuit further comprises:
a latch for storing the compare output from the comparator, the latch generating the first enable signal and the second enable signal as inverses.

7. The battery protection circuit of claim 6 wherein the latch is a flip-flop clocked by the clock.

8. The battery protection circuit of claim 1 wherein the control circuit further comprises:
a direction control input that indicates a direction of intended current flow in the channel of the power transistor;
wherein when the direction control input indicates a forward direction, the control circuit activates the connecting first state when the compare output is in a true state, and activates the isolating second state when the compare output is in a false state;
wherein when the direction control input indicates a reverse direction, the control circuit activates the connecting first state when the compare output is in the false state, and activates the isolating third state when the compare output is in the true state, whereby the isolating second state is activated for the forward direction and the isolating third state is activated for the reverse direction.

9. The battery protection circuit of claim 8 further comprising:
a reverse gate-coupling transistor having a channel connected between the battery node and the first gate node, and a gate that controls the channel, the gate connected to a third gate node;
a third switch, receiving the boosted clock from the voltage booster, for applying the boosted clock to the third gate node in response to the third enable signal; and
a reverse grounding transistor that connects the third gate node to the ground when the third switch is not applying the boosted clock to the third gate node;

whereby the power transistor is biased by the reverse gate-coupling transistor to shut off when the third enable signal is activated.

10. The battery protection circuit of claim 9 wherein the reverse gate-coupling transistor and the reverse grounding transistor are n-channel transistors.

11. A discharge protector comprising:
an external node;
a protected node;
an n-channel power transistor having a gate connected to a first gate node, a drain connected to the external node, and a source connected to the protected node;
a gate-coupling transistor having a gate connected to a second gate node, a drain connected to the external node, and a source connected to the first gate node;
a grounding transistor having a gate controlled at least in part by a first enable signal, a drain connected to the second gate node, and a source connected to a ground node;
a control circuit that generates the first enable signal and a second enable signal;
a voltage booster that receives a clock and generates a boosted clock, the boosted clock having a boosted voltage that is above a power-supply voltage;
a first switch that connects the boosted clock to the first gate node when the first enable signal is active, and isolates the first gate node from the boosted clock when the first enable signal is not active;
a second switch that connects the boosted clock to the second gate node when the second enable signal is active, and isolates the second gate node from the boosted clock when the second enable signal is not active;
a reverse gate-coupling transistor having a gate connected to a third gate node, a drain connected to the protected node, and a source connected to the first gate node;
a reverse grounding transistor having a gate controlled at least in part by the first enable signal, a drain connected to the third gate node, and a source connected to the ground node; and
a third switch that connects the boosted clock to the third gate node when a third enable signal is active, and isolates the third gate node from the boosted clock when the third enable signal is not active;
wherein the control circuit also generates the third enable signal.

12. The discharge protector of claim 11 wherein the control circuit further comprises:
a comparator that compares voltages of the external node and the protected node to generate a compare output.

13. The discharge protector of claim 11 wherein the gate-coupling transistor, the reverse gate-coupling transistor, the grounding transistor, and the reverse grounding transistor each comprise an n-channel transistor.

14. The discharge protector of claim 11 wherein the first switch comprises:
a first p-channel series pass transistor having a gate connected to a first p-gate node, a drain connected to an intermediate node, and a source connected to the boosted clock, and a bulk connected to the boosted clock;
a second p-channel series pass transistor having a gate connected to an inverse of the first enable signal, a drain connected to the first gate node, and a source connected to the intermediate node, and a bulk connected to the first gate node;
a first n-channel pass transistor having a gate connected to the first enable signal, a source connected to the first gate node, and a drain connected to the boosted clock;
a first p-channel shorting transistor having a gate connected to the first enable signal, a source connected to the boosted clock, and a drain connected to the first p-gate node, and a bulk connected to the boosted clock; and
a first n-channel switch-grounding transistor having a gate connected to the first enable signal, a drain connected to the first p-gate node, and a source connected to the ground node;
an intermediate n-channel switch-grounding transistor having a gate connected to the inverse of the first enable signal, a drain connected to the intermediate node, and a source connected to the ground node.

15. The discharge protector of claim 11 wherein the second switch comprises:
a second p-channel pass transistor having a gate connected to a second p-gate node, a drain connected to the second gate node, and a source connected to the boosted clock;
a second n-channel pass transistor having a gate connected to the second enable signal, a source connected to the second gate node, and a drain connected to the boosted clock;
a second p-channel shorting transistor having a gate connected to the second enable signal, a source connected to the boosted clock, and a drain connected to the second p-gate node, and a bulk connected to the boosted clock; and
a second n-channel switch-grounding transistor having a gate connected to the second enable signal, a drain connected to the second p-gate node, and a source connected to the ground node.

16. An integrated pulse battery charger comprising:
a first terminal for connecting to a charger;
a second terminal for connecting to a battery;
power transistor means for conducting current between the first terminal and the second terminal in response to a first gate node;
compare means for comparing voltages of the first terminal and the second terminal to generate a compare output;
control circuit means, receiving the compare output, for generating a first enable signal and a second enable signal;
gate-coupling transistor means for conducting current between the first terminal and the first gate node in response to a second gate node;

grounding transistor means for conducting current between the second gate node and a ground node in response to a gate at least partially controlled by the first enable signal;

voltage boost means, receiving a clock, for generating a voltage-boosted clock having a high voltage in excess of a power-supply voltage;

first switch means for driving the voltage-boosted clock onto the first gate node in response to the first enable signal;

second switch means for driving the voltage-boosted clock onto the second gate node in response to the second enable signal;

second gate-coupling transistor means for conducting current between the second terminal and the first gate node in response to a third gate node;

second grounding transistor means for conducting current between the third gate node and the ground node in response to a gate at least partially controlled by the first enable signal; and third switch means for driving the voltage-boosted clock onto the third gate node in response to a third enable signal;

wherein the control circuit means is further for generating the third enable signal, whereby the battery is charged by the charger during high pulses of the voltage-boosted clock.

17. The integrated pulse battery charger of claim 16 wherein the power transistor means, the gate-coupling transistor means, and the grounding transistor means each comprise an n-channel transistor.

* * * * *